United States Patent [19]

Staats, Jr.

[11] Patent Number: 4,590,793
[45] Date of Patent: May 27, 1986

[54] PRESSURE PUMP WITH VOLUMETRIC LEAK RATE DETECTOR

[76] Inventor: William L. Staats, Jr., 52 Knox Ave., Berwyn, Pa. 19312

[21] Appl. No.: 621,375

[22] Filed: Jun. 18, 1984

[51] Int. Cl.⁴ .............................................. G01M 3/26
[52] U.S. Cl. .................................... 73/40; 73/40.5 R
[58] Field of Search ............... 73/37, 40, 49.3, 40.5 R, 73/49.2, 49.1, 49.5

[56] References Cited

U.S. PATENT DOCUMENTS

| | | | |
|---|---|---|---|
| 3,100,986 | 8/1963 | Starr et al. | 73/40 |
| 3,580,055 | 5/1971 | White | 73/49.2 |
| 3,788,127 | 1/1974 | Marsh | 73/40 |
| 3,910,102 | 10/1975 | McLean | 73/49.2 |
| 4,114,426 | 9/1978 | McLean | 73/40.5 R |
| 4,161,957 | 7/1979 | Schoellkopf | 73/40.5 R |
| 4,474,054 | 10/1974 | Ainlay | 73/49.2 |

FOREIGN PATENT DOCUMENTS 599517 6/1960 Canada ................................... 73/40

*Primary Examiner*—Stewart J. Levy
*Assistant Examiner*—Hezron E. Williams
*Attorney, Agent, or Firm*—Ruth Moyerman

[57] ABSTRACT

This invention is a detector of volumetric leak rate from a closed system, and includes a level testing unit, a pressure vacuum pump and a safety can connected together by lines fitted with valves and gauges.

3 Claims, 2 Drawing Figures

PRESSURE PUMP WITH VOLUMETRIC LEAK RATE DETECTOR

This invention relates generally to devices for detecting leaks in underground piping systems.

It is well known, to those persons who are acquainted with the particular field, that leaks from underground piping systems have become a serious problem to the petroleum industry. Such leaks pollute the wells, streams and groundwater, in addition to creating hazardous fumes. The spilled oil results in financial losses to the industry. Many local and state governmental agencies have already promulgated regulations, requiring routine testing of underground systems, and national regulations are impending. In addition, the industry acknowledges the need to test systems on a preventive program, especially if problems are suspected in an area. Accordingly, there is a need at this time for further improvement in devices that test the soundness of underground piping systems.

Therefore, it is a principal object of the present invention to provide a leak detecting device, that incorporates a pressure pump, together with volumetric leak rate means, so that the device is very fast to read, and extremely accurate.

Another object is to provide a pressure pump with volumetric leak rate detector, that is not limited only to the petroleum industry, but is suitable for testing the tightness of any other system of lines and vessels used for other fluids or chemicals.

Other objects are to provide a pressure pump with volumetric leak rate detector, which is simple in design, inexpensive to manufacture, rugged in construction, easy to use, and efficient in operation.

These, and other objects, will be readily evident, upon a study of the following specification, and the accompanying drawing, wherein.

Figure 1:
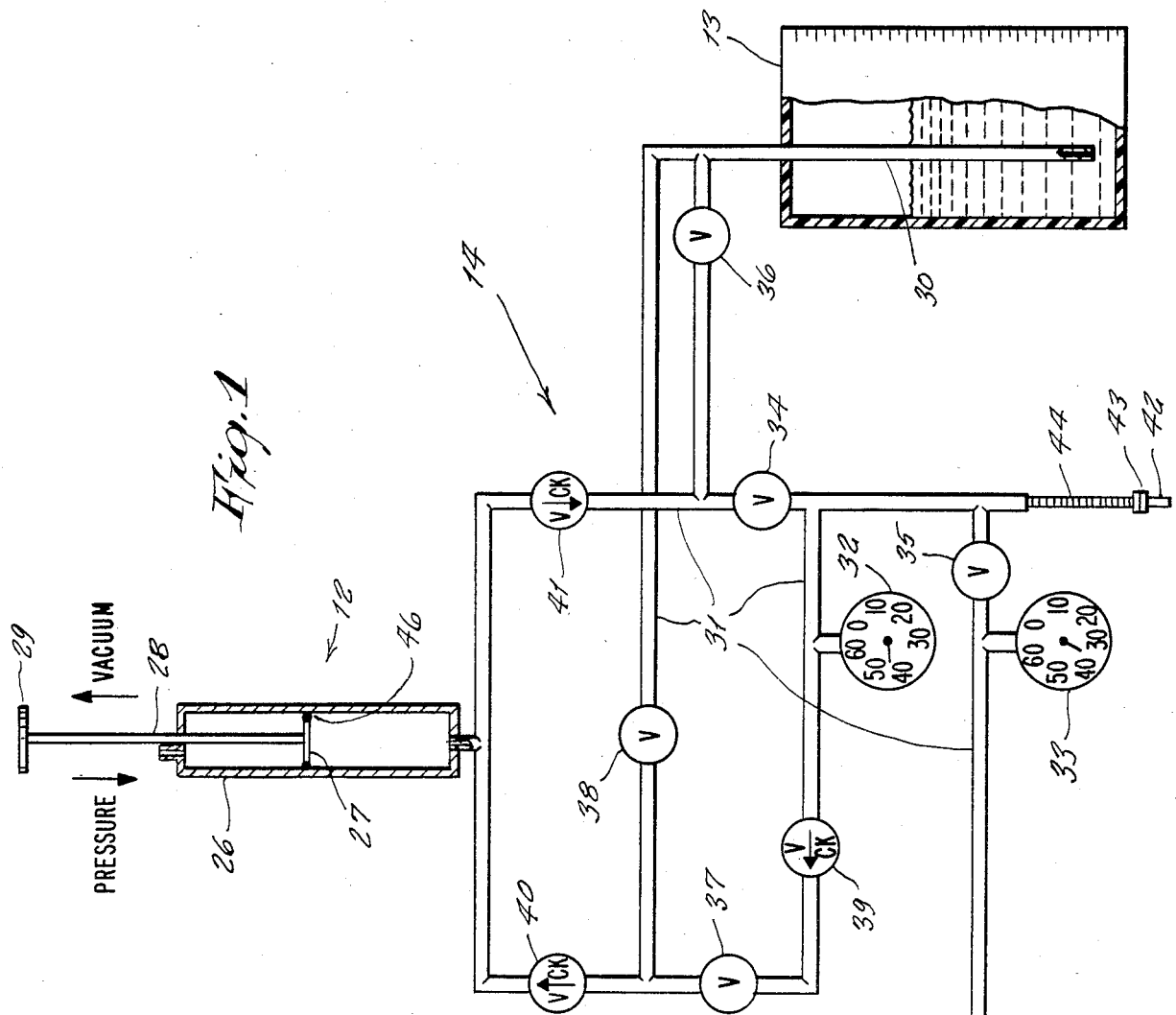
FIG. 1 is a schematic diagram of the invention.

Referring now to the drawing in greater detail, the reference numeral 10 represents the invention assembly, wherein there is a level testing unit 11, (which is removable from pressure pump assembly 12, safety can 13,) It may be attached anywhere on line of system to be tested or kept as one unit 10. a pressure vacuum pump 12 and a safety can 13, that are connected by a piping system 14.

Figure 2:
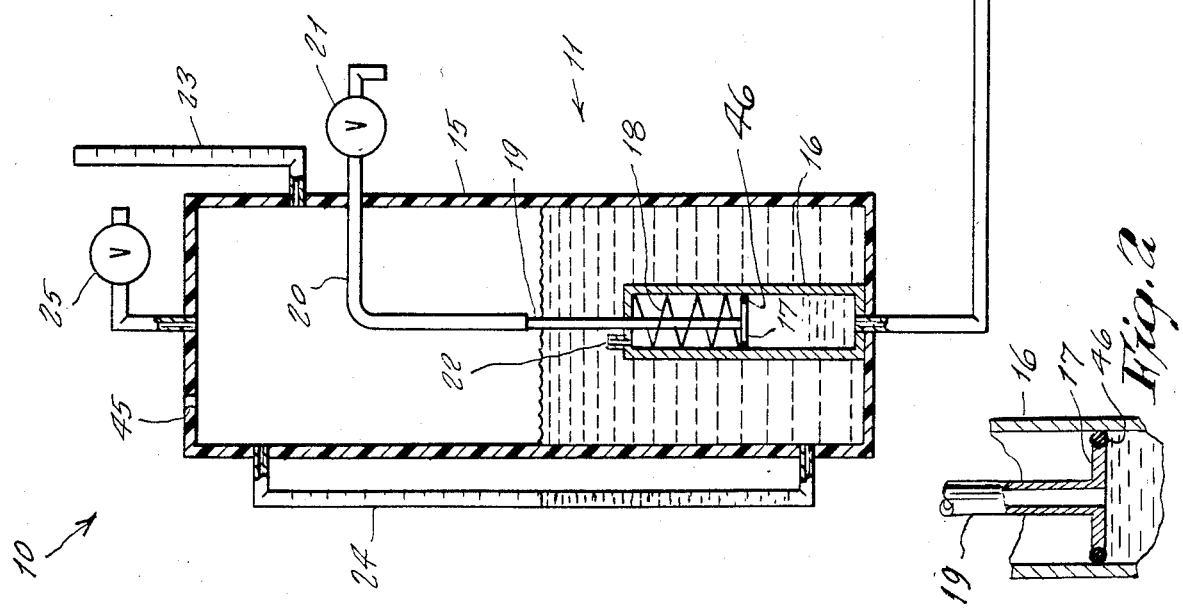
FIG. 2 is an enlarged detail view of a portion of the structure shown in FIG. 1.

The unit 11 includes a tank 15, an hydraulic cylinder 16 containing a flat, hole-perforated piston 17, urged by a compression spring 18. The piston is mounted on a copper line 19, connected by a flexible line 20 to an exterior valve 21. The end of the copper line 19 is fitted in the hole of piston 17, and both the copper line and the flexible line 20 are tubular, as shown in FIG. 2, whereby any air inside the lower compartment of the cylinder, under the piston 17, can be vented through the valve 21 and outward into the atmosphere; thus leaving only a gasoline (or other liquid) alone within the cylinder lower compartment. After the air is purged outward, the valve 21 is closed so that the invention may then be operated. The cylinder 16 has a vent 22, for communication with the interior of the tank. The tank is fitted with a sight glass 23, having 10 ML graduations, a sight glass 24 having ML 100 graduations, and a bleed valve 25. The sight glass 24 is observed when this equipment is used to detect large leaks; and the sight glass 23 is observed when used to detect small leaks.

The pressure vacuum pump 12 includes an air-vented cylinder 26, containing piston 27 on a piston rod 28, fitted with exterior handle 29.

The safety can 13 comprises a graduated vessel, into which a discharge blow-off line 30 of the piping system extends.

The piping system 14 comprises a network of pipes or lines 31, which are fitted with a pressure gauge 32, a pressure gauge 33, valves 21, 34, 35, 36, 37, and 38, and one way check valves 39, 40, and 41. The piping system is connected to the underground system being tested, by means of a female connector 42, and a dry break connector 43 on a flexible hose 44 at one end of the piping system 14.

The first step in test procedure is to remove the plug from the neck of an impact valve, such as in a gasoline dispensing system that is to be tested, preferably wherein the valve is farthest away from a remote pump in an underground tank. Insert the female connector 42 into the valve neck. Hook up the dry break connector 43 on the connector 42. Add antifreeze (or other fluid) into the tank 15, through a filler plug opening 45. Bring the level up to a mid-point of the tank, where it can be seen on sight glass 24. Install a plug in the filler plug opening 45, as shown in FIG. 1 of the drawing. The level can be raised higher, by adding more antifreeze with a funnel, through the top of the sight glass 23, as needed. If the rate of loss or gain is too small to be measured on sight glass 24, then continue to fill the tank completely through the sight glass 23, while venting the tank through the bleed valve 25. When the antifreeze appears at the bleed valve, then shut off the bleed valve, and continue the filling until the level is one half way up the sight glass 23. The testing may now be started.

In some cases, it may be necessary to install a modified check valve into the remote pump, before the remote pumps are purged of air, therefore necessitating some larger amounts of gas to be drawn from dispensers, to remove air trapped in lines. This is usually done by letting station owners sell the estimated amount needed to clear the line of any air bubbles that could have developed during check valve installation. Gas is drawn from each dispensing pump in the system, larger amount from farthest dispensing unit to purge air from the system, and fill it throughout with gasoline. The line pressure tester is now ready to be purged of air, and charged with gasoline through a series of valve changes. Turn on the remote pump and open the valves 34, 35, 36, 37, 38, and 21. Air and excess gas will discharge into safety can 13; (valve 21 is not hooked up to the discharge blow-off line 30). After one or two gallons of gas are pumped and no air bubbles sighted from the discharge blow-off line, the valves 21, 34, 36, 37 and 38 are closed. With remote pump running, close all latch mechanism in the system being tested. Screw down the check valve of the system being tested, or follow manufacturers instructions for pressure testing lines at the remote pump. Turn off power to the remote pump, and check pressure on gauges 32 and 33. This is usually around 28 to 30 pounds per square inch gauge. If pressure drops, it could be due to a defective check valve or relief valve in the remote pump, and needs to be repaired or replaced. Proceed to pressure up lines with line pressure, using pump with volumetric leak rate detector. Copper line 30 pulls gas from safety can 13, to pressure up line being tested to 50 pounds or more pounds per square inch gauge by the following steps:

Pull up on pump handle 29, attached to shaft 28, which, in turn, pulls vacuum on piston 27 inside cylinder 26.

Open valve 38 and a gas will be drawn by vacuum into cylinder 26 through valve 38 and check valve 40.

Open valves 34 and 35 and push down pump handle 29. Gasoline drawn from safety can 13 will be forced from cylinder 26 through valves 35 and 34 and check valve 41. The one way check valve 40 will be closed on the piston downstroke, forcing gasoline into the line being tested, as well as forcing the raising of piston 17. Back pressure from the spring 18 will keep pressure on the gas being forced through the opening in piston 17 and copper line 19 when downward pressure is applied to handle 29 of pump 12. Pressure gauge 33 is utilized to monitor the pressure applied to the line by pump 12. The pressure applied will raise the antifreeze level on the sight glass by allowing the antifreeze, sealed from gas by O-ring 46, to move out of hole 22 and register in sight glass 23 or 24.

Continue to use pressure vacuum pump 10 until all liquid (for example, gasoline) is packed into the lines. Pressure gauges 22 and 33 will then read 50 pounds. Mark on the sight glass 23 or 24 the level to which the antifreeze has risen, making sure that pressure remains 50 pounds. Close valve 34.

Let the pressure vacuum pump assembly 10 stand for ten minutes. Shut off valve 33 and make a record of the pressure reading. Mark new antifreeze level indicated in sight glass 23 or 24. If there is a difference between the start level of antifreeze and the stop level of antifreeze, calculate the difference.

For example:

| start level | 200 ml |
| stop level | 100 ml |
| LOSS | 100 ml in ten minutes |
| start level | 200 ml |
| stop level | 500 ml |
| GAIN | 300 ml in ten minutes |

Thus, the pressure vacuum pump 10 of this invention is capable of measuring leaks in both positive and negative readings.

While various changes may be made in the detail construction, it is understood that such changes will be within the spirit and scope of the present invention, as is defined by the appended claims.

What I now claim is:

1. A pressure pump with volumetric leak rate detector, comprising, in combination, a level testing unit, a pressure vacuum pump and a safety can connected together by a piping system, and said piping system including means for connection to an underground installed piping system; said level testing unit comprising a tank, a hydraulic cylinder mounted inside a lower end of said tank, a spring biased piston inside said cylinder forming a lower and an upper chamber in said cylinder, a first pipe of said piping system communicating with said lower chamber, said upper chamber freely communicating with an interior of said tank, a piston rod of said piston being tubular and connected to a flexible hose extending outwardly of said tank for exterior communication of said lower chamber, a vent valve on said hose and a vent valve on said tank, and said tank having a lower sight glass for reading a fluid level inside said tank; a second pipe of said piping system being connected to said pressure vacuum pump; and a third pipe of said piping system being connected to said safety can; and said piping system including a plurality of guages, and a plurality of valves and check valves for selective communication between said level testing unit, said pressure vacuum pump, said can and said underground installed piping system.

2. The pressure pump with volumetric leak rate detector according to claim 1 wherein said gauges are calibrated in millimeters and measures volume changes in plus or minus.

3. The pressure pump with volumetric leak rate detector according to claim 1 wherein liquid is cleared from said piping system tested by vacuum.

* * * * *